(12) United States Patent
Bogdanovych et al.

(10) Patent No.: US 10,402,689 B1
(45) Date of Patent: Sep. 3, 2019

(54) GENERATING AN IMAGE MASK USING MACHINE LEARNING

(71) Applicant: Snap Inc., Venice, CA (US)

(72) Inventors: Lidiia Bogdanovych, Los Angeles, CA (US); William Brendel, Los Angeles, CA (US); Samuel Edward Hare, Pacific Palisades, CA (US); Fedir Poliakov, Marina Del Rey, CA (US); Guohui Wang, Los Angeles, CA (US); Xuehan Xiong, Los Angeles, CA (US); Jianchao Yang, Venice, CA (US); Linjie Yang, Los Angeles, CA (US)

(73) Assignee: Snap Inc., Santa Monica, CA (US)

(*) Notice: Subject to any disclaimer, the term of this patent is extended or adjusted under 35 U.S.C. 154(b) by 154 days.

(21) Appl. No.: 15/706,057

(22) Filed: Sep. 15, 2017

Related U.S. Application Data

(60) Provisional application No. 62/481,415, filed on Apr. 4, 2017.

(51) Int. Cl.
| | |
|---|---|
| *G06T 7/11* | (2017.01) |
| *G06K 9/62* | (2006.01) |
| *G06K 9/74* | (2006.01) |
| *G06T 7/194* | (2017.01) |
| *G06N 3/08* | (2006.01) |
| *G06N 3/04* | (2006.01) |
| *G06K 9/68* | (2006.01) |
| *H04N 7/14* | (2006.01) |
| *H04N 5/445* | (2011.01) |
| *H04N 5/76* | (2006.01) |

(52) U.S. Cl.
CPC .......... *G06K 9/6256* (2013.01); *G06K 9/626* (2013.01); *G06K 9/6807* (2013.01); *G06K 9/74* (2013.01); *G06N 3/04* (2013.01); *G06N 3/08* (2013.01); *G06T 7/11* (2017.01); *G06T 7/194* (2017.01); *G06T 2207/10016* (2013.01); *G06T 2207/10024* (2013.01); *G06T 2207/20024* (2013.01); *G06T 2207/20081* (2013.01); *G06T 2207/20084* (2013.01); *G06T 2207/20221* (2013.01); *G06T 2207/30201* (2013.01); *H04N 5/44504* (2013.01); *H04N 5/76* (2013.01); *H04N 7/141* (2013.01)

(58) Field of Classification Search
None
See application file for complete search history.

(56) References Cited

U.S. PATENT DOCUMENTS

| | | | |
|---|---|---|---|
| 2014/0003719 A1* | 1/2014 | Bai | G06T 7/269 382/173 |
| 2016/0154993 A1* | 6/2016 | Aarabi | G06T 7/11 382/118 |
| 2017/0061258 A1* | 3/2017 | Chen | G06N 3/08 |
| 2019/0066279 A1* | 2/2019 | Monkarsh | G06T 5/10 |

* cited by examiner

*Primary Examiner* — Bernard Krasnic
(74) *Attorney, Agent, or Firm* — Schwegman Lundberg & Woessner, P.A.

(57) ABSTRACT

A machine learning system can generate an image mask (e.g., a pixel mask) comprising pixel assignments for pixels. The pixels can be assigned to classes, including, for example, face, clothes, body skin, or hair. The machine learning system can be implemented using a convolutional neural network that is configured to execute efficiently on computing devices having limited resources, such as mobile phones. The pixel mask can be used to more accurately display video effects interacting with a user or subject depicted in the image.

20 Claims, 16 Drawing Sheets

GENERATING AN IMAGE MASK USING MACHINE LEARNING

RELATED APPLICATIONS

This application claims the priority benefit of U.S. Provisional Application No. 62/481,415, entitled "Generating a Pixel Mask Using Machine Learning," filed on Apr. 4, 2017, which is hereby incorporated by reference in its entirety.

TECHNICAL FIELD

Embodiments of the present disclosure relate generally to image processing and, more particularly, but not by way of limitation, to generating image masks using machine learning.

BACKGROUND

In recent years, mobile computing devices have allowed users to apply image effects (e.g., image overlays, video effects) to one or more images captured via the client devices. Image effects can be applied to regions within a given image (e.g., recolor pixels of a person's face while leaving pixels of the person's hair unmodified). However, labeling different regions of a given image can be computationally intensive, especially on mobile devices which can be limited processing power and memory.

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

Figure 1:
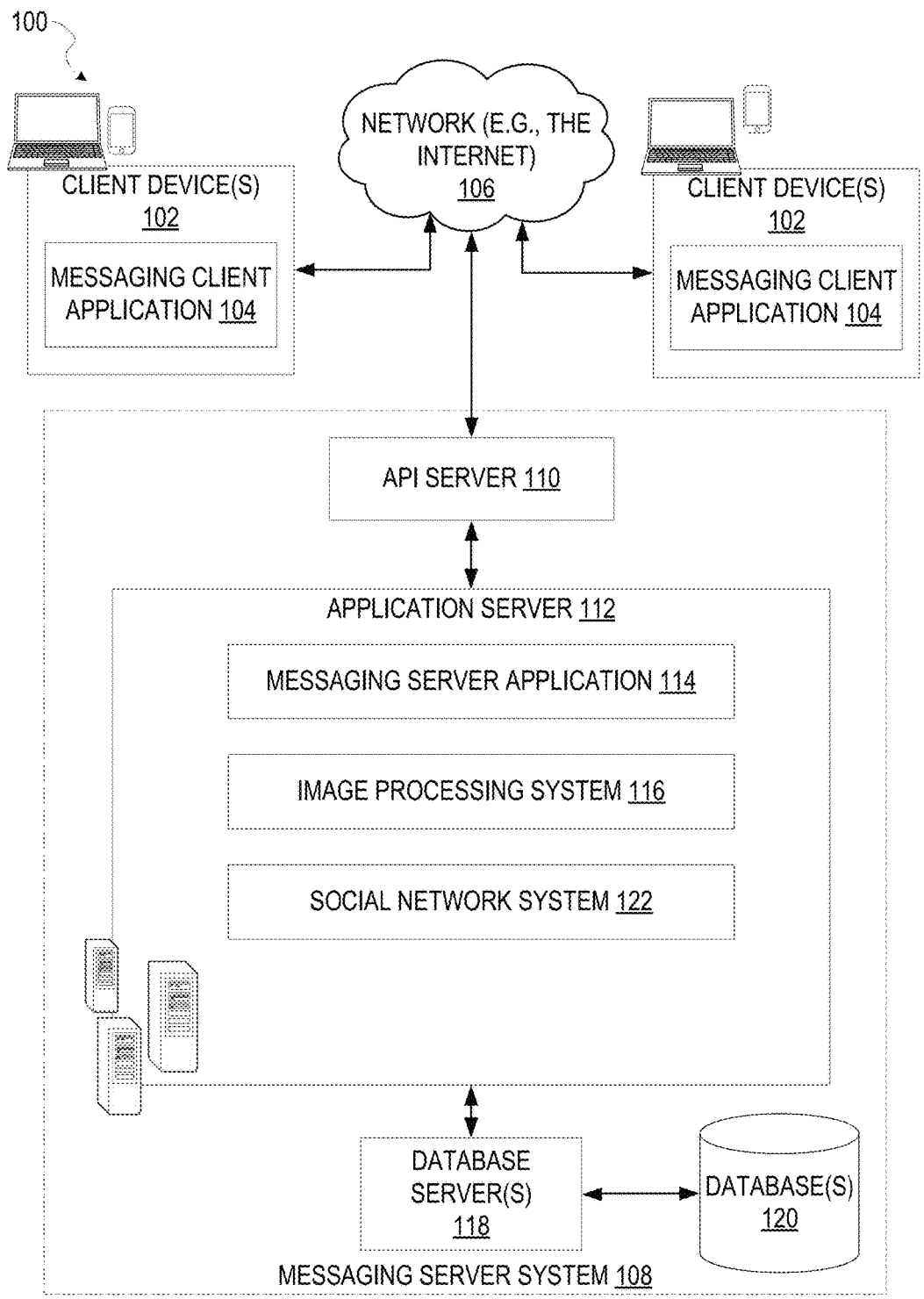
FIG. 1 is a block diagram showing an example messaging system for exchanging data (e.g., messages and associated content) over a network.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In recent years, mobile computing devices have allowed users to apply image effects (e.g., image overlays, video effects) to one or more images captured via the client devices. Image effects can be applied to regions within a given image using image masks. An image mask is a representation of a given image that labels areas within the image. Image masks can, for example, be used to recolor pixels of a person's face while leaving pixels of the person's hair unmodified. However, generating image masks for different regions of a given image can be computationally intensive, especially on mobile devices which can be limited processing power and memory.

To this end, an image mask can be used to label different areas of an image to different values. For example, a face image mask may leave pixels of the face unmodified, but may set values outside the face area to zero (e.g., where a pixel of zero value is black). Mask data are labels, which can be stored in a different image file. The image mask file may be an image that has the same pixel dimensions as the original image, but each pixel may be set to a given value to indicate the area or label to which it belongs. In some example embodiments, mask data (e.g., pixel values for labels) can be stored as channel data of each pixel (e.g., instead of a pixel having a 3-channel RGB value, it may have a fourth M channel, e.g., RGBM). Further, the image mask data may be polygon metadata, whereby each polygon encircles a given type of masked area, and the polygon vertices are stored as metadata for a given image. Using image masks, image and video affects can be applied to different areas of an image with greater specificity.

In some example embodiments, a set of training images are labeled with polygons around each area (e.g., face area, hair area, clothes area). The polygons can be created using human labels (e.g., that drag and hold over different areas or outline different areas to create the polygons). Vertices of the polygons can be stored as label metadata.

The labeled set of training images (e.g., image masks) can be resized into sets of training images of different sizes, e.g., large, medium, small. A segmentation engine implementing a neural network can train its neural network model using the different sized training image sets as part of a multi-scale training process. The training process configures the neural network model to receive a given original image as an input and output an image mask with different areas labeled into segments. After training, the neural network can run from client devices that use images of different resolutions, as discussed in further detail below. Further, in some example embodiments, generated image masks can be refined in a post-processing phase to refine borders of the labeled areas and remove noise.

At runtime, the user can use his or her client device to take one or more images (e.g., a photograph, a video sequence). The trained image mask system can then efficiently detect the different areas and label them as different segments in an image mask. Different visual effects can be applied to differently labeled areas. For example, if the mask includes a hat area, a depicted hat may be replaced with a zany cartoon hat. The modified images (e.g., an image of a subject wearing a zany hat) can be published as an ephemeral message on a social media network directly from the client device, according to some example embodiments.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, and a social network system 122. The messaging server application 114 implements a number of message-processing technologies and functions particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user.

The application server 112 is communicatively coupled to a database server 118, which facilitates access to a database 120 in which is stored data associated with messages processed by the messaging server application 114.

Figure 2:
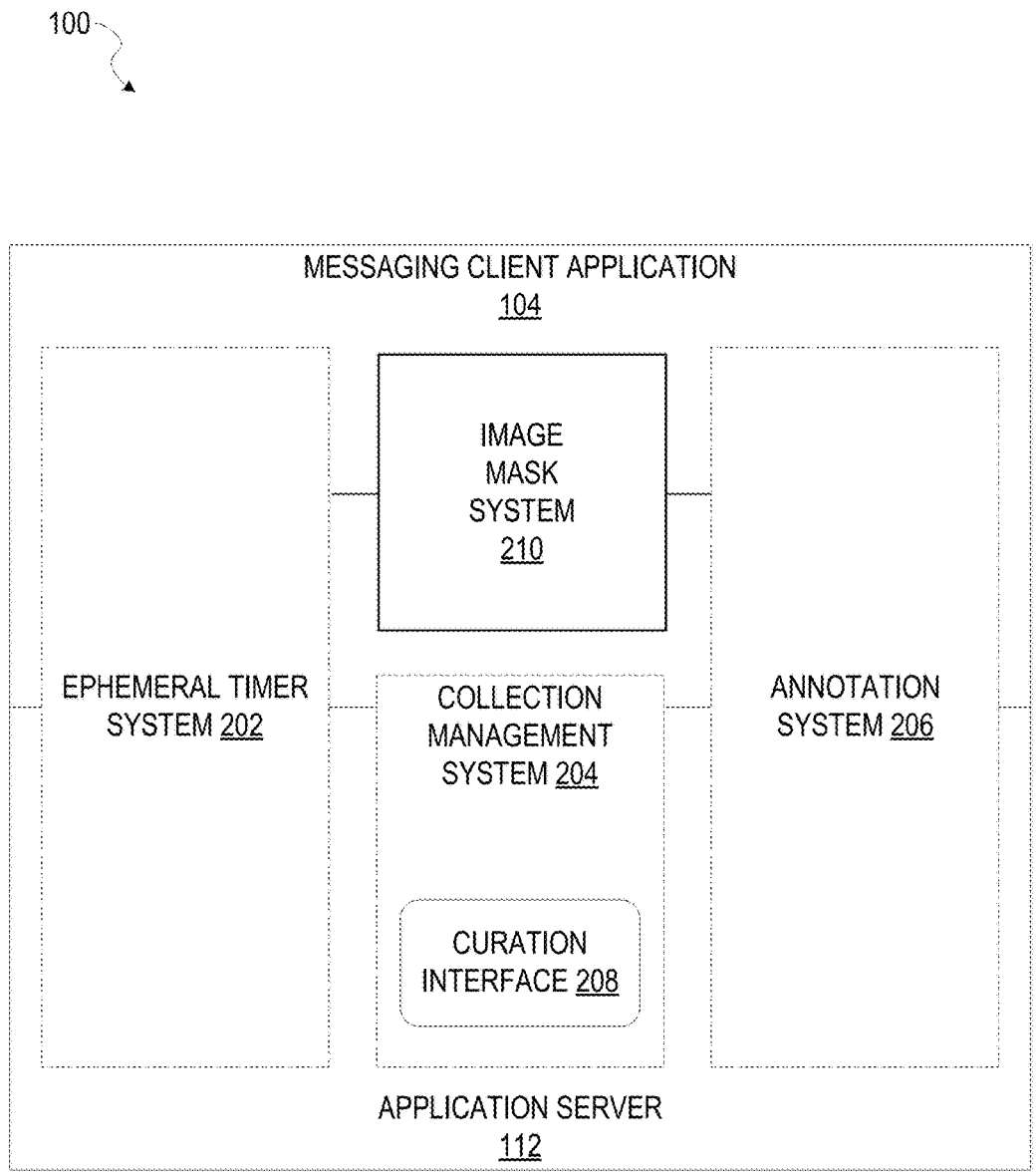
FIG. 2 is block diagram illustrating further details regarding a messaging system having an integrated virtual object machine learning system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and an image mask system 210.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a SNAPCHAT Story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT Geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, text, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The image mask system 210 manages generating image masks (e.g., pixel masks) for images (e.g., images tracked in image table 308 discussed below). The image masks can be used by the messaging client application 104 to produce visual effects on a depicted human subject. For example, the annotation system 206 can use the mask to apply different filters to different labeled areas using the mask.

Figure 3:
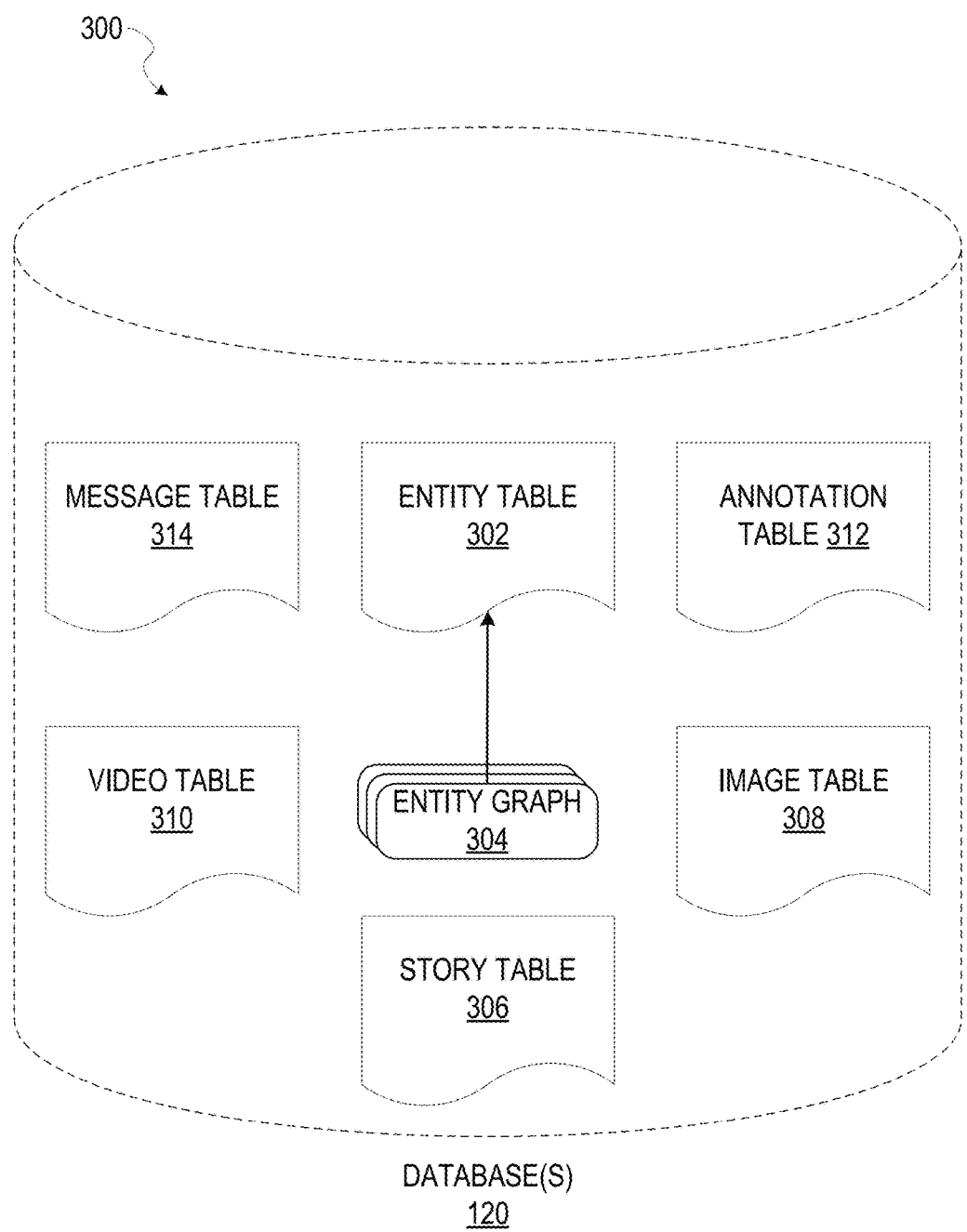
FIG. 3 is a schematic diagram illustrating data that may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT Story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
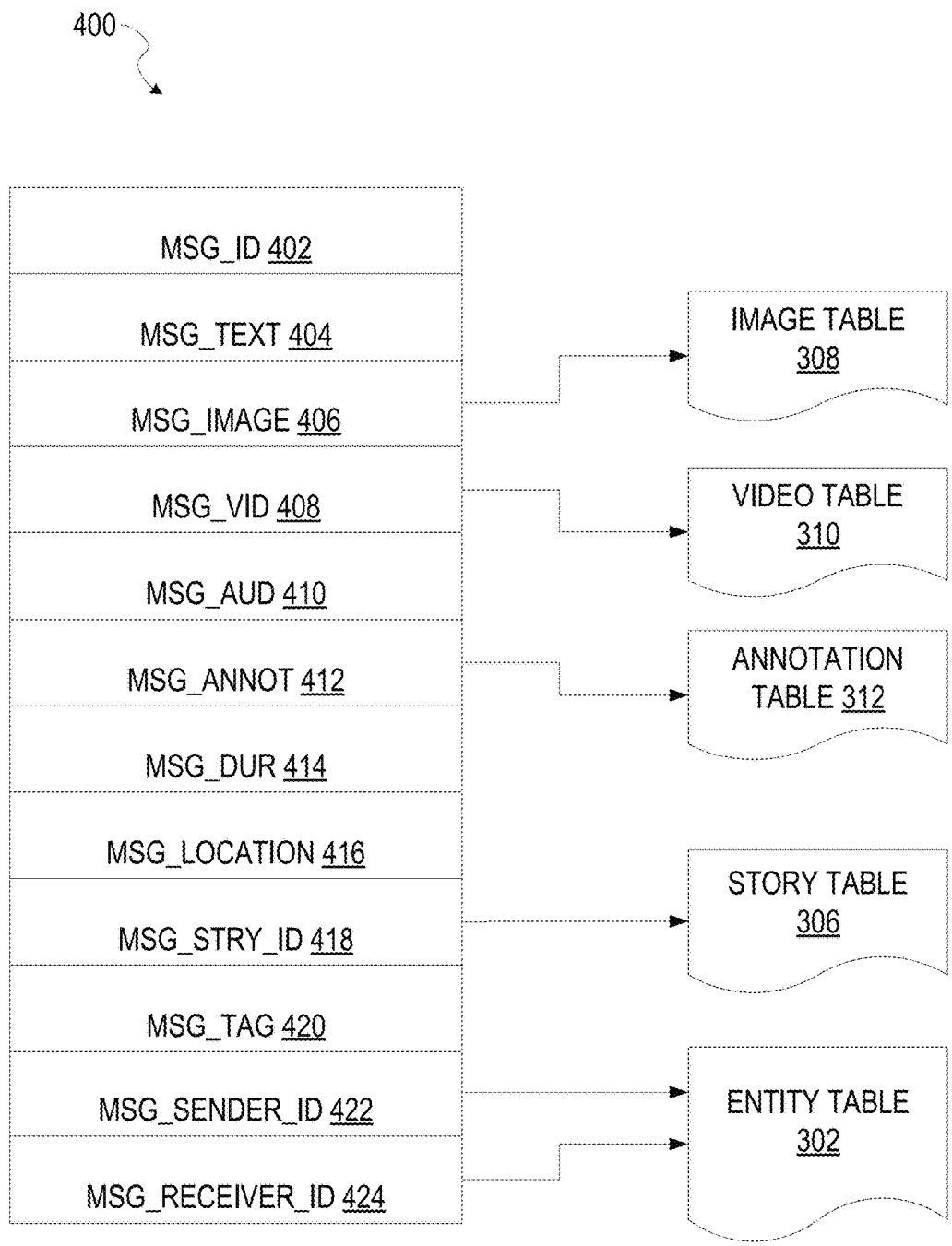
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102, and that is included in the message 400.

A message image payload 406: image data captured by a camera component of a client device 102 or retrieved from memory of a client device 102, and that is included in the message 400.

A message video payload 408: video data captured by a camera component or retrieved from a memory component of the client device 102, and that is included in the message 400.

A message audio payload 410: audio data captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).

A message story identifier 418: identifies values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
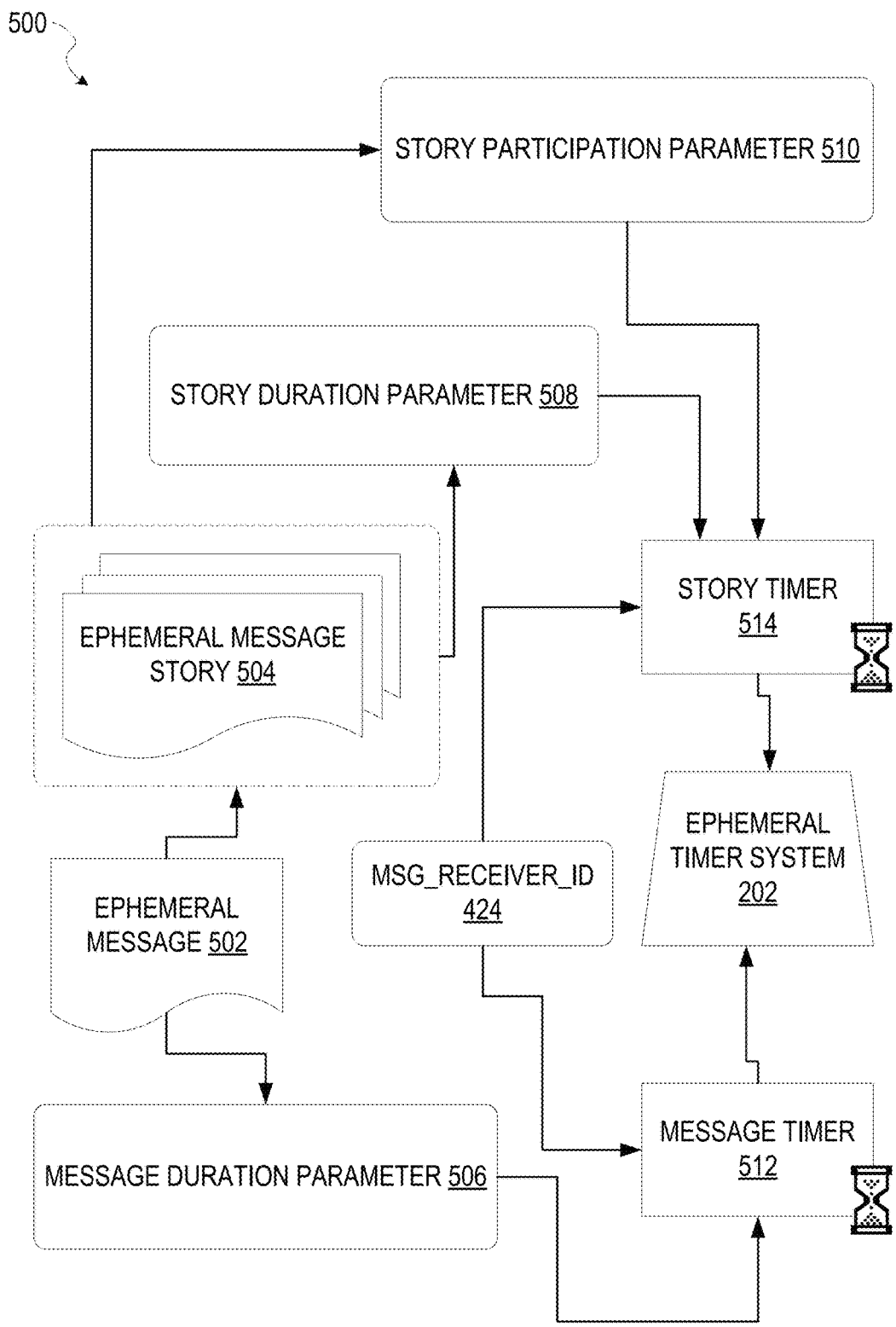
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT Story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of the ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
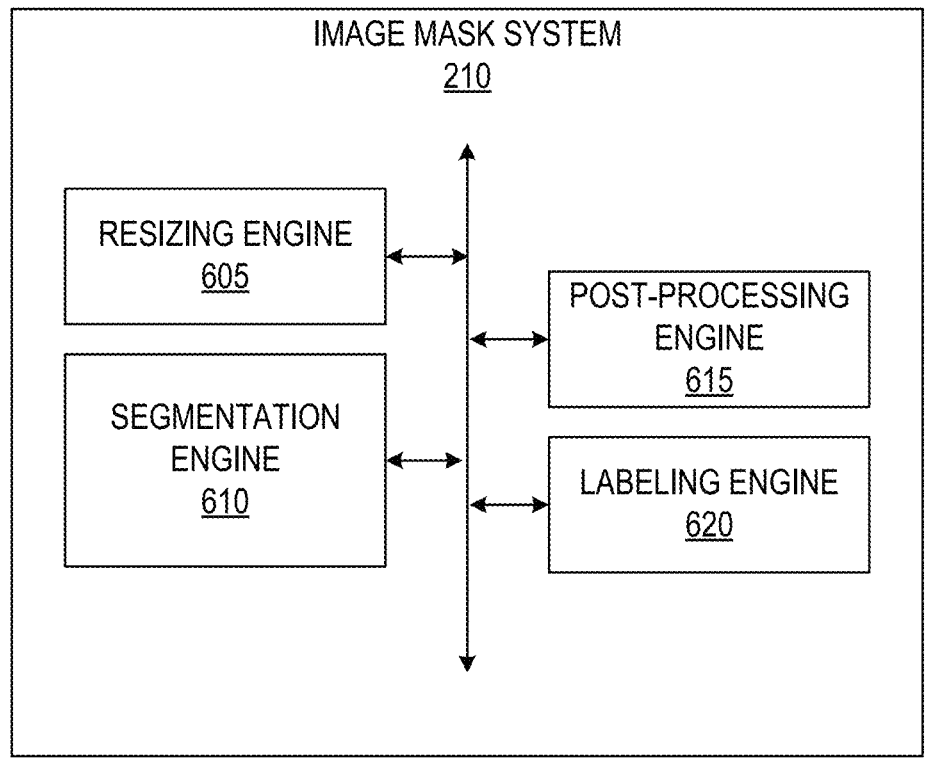
FIG. 6 illustrates a block diagram showing example functional components in an image mask system, according to some embodiments.

FIG. 6 illustrates a block diagram showing example functional components provided within the image mask system 210, according to some embodiments. In various example embodiments, the image mask system 210 comprises a resizing engine 605, a segmentation engine 610, a post-processing engine 615, and a labeling engine 620. Briefly, the resizing engine 605 resizes input images, which the segmentation engine 610 can use for classification. The segmentation engine 610 is configured to apply a convolutional neural network to an image to classify pixels in the image. The post-processing engine 615 is configured to remove noise and enhance boundaries in a given image. In particular, for example, the post-processing engine 615 may use a guided filter, where for a given mask, M, the original image, I, from which the mask was generated is used as a filter guide to smooth over errors in the mask, M. The labeling engine 620 is configured to manage labeling of the training image data by receiving input (e.g., polygon data) from one or more human labelers. The components themselves are communicatively coupled (e.g., via appropriate interfaces) to each other and to various data sources, so as to allow information to be passed between the applications or so as to allow the applications to share and access common data.

Figure 7:
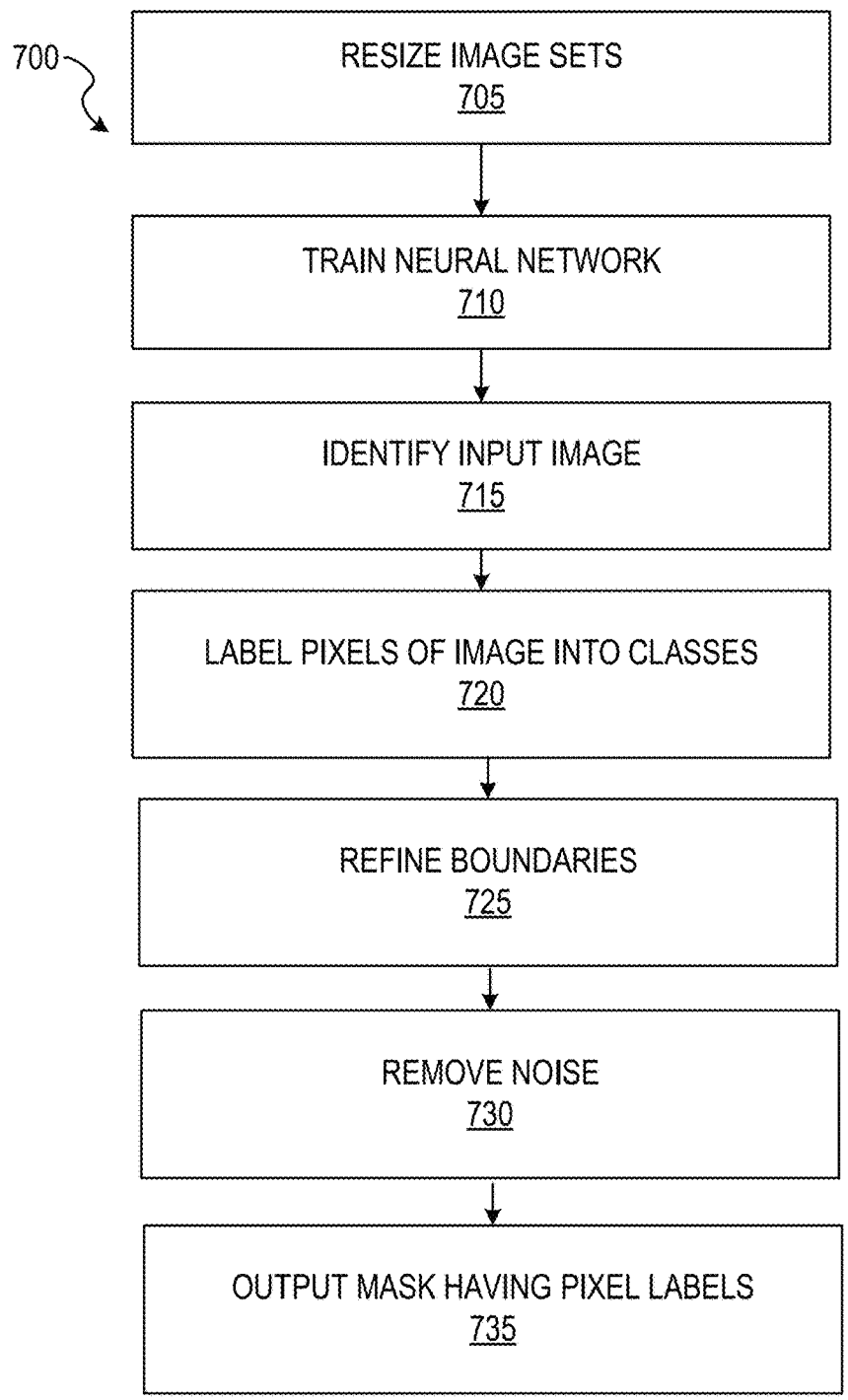
FIG. 7 shows a flow diagram of a method for implementing labeling pixels with mask data using an image mask system, according to some example embodiments.

FIG. 7 shows a flow diagram of a method 700 for implementing a computationally efficient system for creating a mask, according to some example embodiments. At operation 705, the resizing engine resizes images to a plurality of sizes. For example, the resizing engine 605 generates one or more enlarged images that are larger than the original image and further generates one or more reduced size images that are smaller than the original image.

At operation 710, the segmentation engine 610 trains a machine learning scheme on training data. In some embodiments, the machine learning scheme is a convolutional neural network (CNN). Further, in some example embodiments, the segmentation engine 610 trains the convolutional neural network on one of the resized image sets based on the client device. For example, if the client device is a latest model smartphone with the latest processing power, the segmentation engine 610 trains CNN on the enlarged image set; whereas if the client device is an older smartphone with reduced processing power, the segmentation engine 610 trains the CNN on the reduced size image set.

At operation 715, the segmentation engine 610 identifies an input image for classification (e.g., area classification, mask generation). At operation 720, the semantic segmentation engine assigns a label to each pixel of the image. The labels correspond to classes such as face, clothes, and headwear, as discussed above. At operation 725, the post-processing engine 615 performs post processing on the output of the segmentation engine 610 to refine boundaries between pixels having different labels. At operation 730, the post-processing engine 615 performs further post-processing to remove noise. For example, the post-processing engine 615 removes noise by removing the background so only the foreground remains in the image (e.g., only the subject human of the image and mask remain).

At operation 735, the post-processing engine 615 outputs the mask and image data as output data. The output data can be used to perform more accurate live video filters on the subject being depicted in the image. For example, cartoon glasses may be overlaid on the subject's face using the face labeled pixels, or a cartoon hat may replace the real-life hat.

Figure 8:
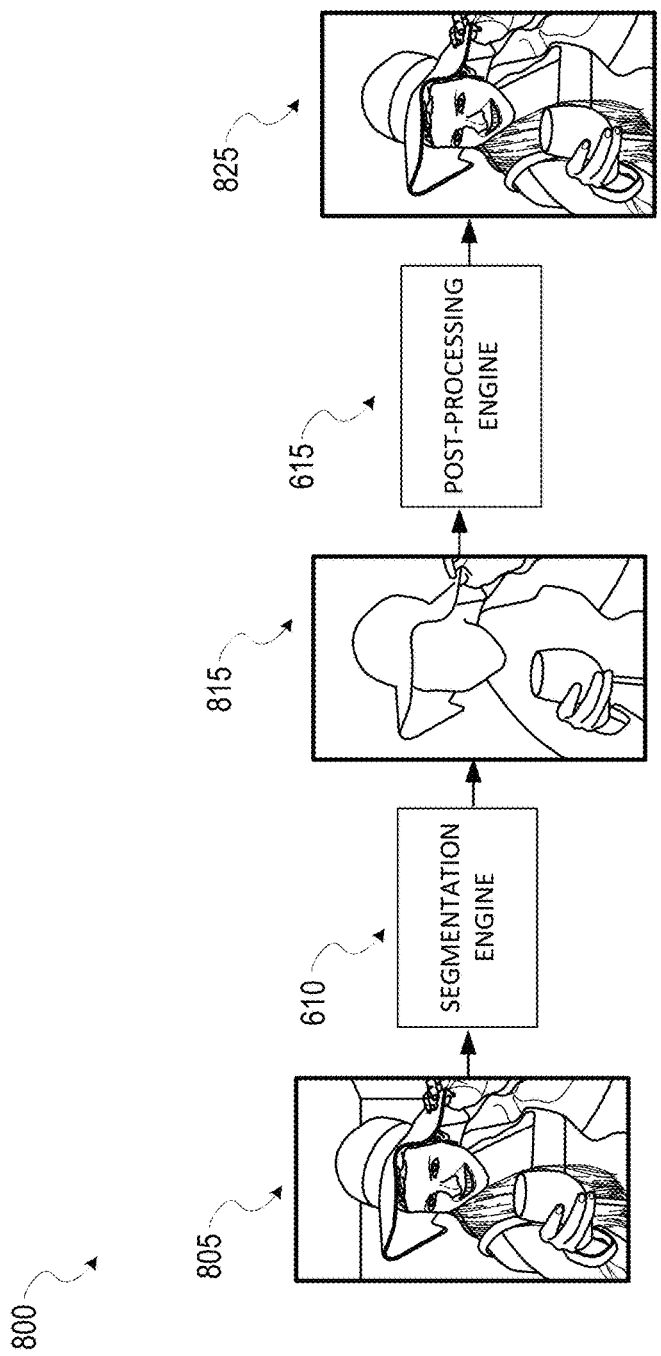
FIG. 8 shows a functional architecture for processing label data for a mask, according to some example embodiments.

FIG. 8 shows a functional architecture 800 for processing labels, according to some example embodiments. Using multiple labels for training instead of just using foreground/background for training enables a machine learning scheme (e.g., a neural network) to learn richer semantics about the image, and further enables the machine learning scheme in making more accurate predictions. In the example illustrated, the input image 805 is an image of a girl with a hat holding a wine glass. The semantic segmentation engine 610 applies its trained machine learning scheme to the input image 805 to output label data 815 comprising the image with each pixel labeled or otherwise assigned to a semantic class, such as hair, face, body, headwear, body skin, clothes, background, and so forth. The label data 815 is input into a post-processing engine 615 to perform additional refinements. The post-processing engine 615 outputs refined image data 825. The refinements performed by the post-processing engine 615 refine the boundaries in the image (e.g., the boundary between hair pixels and face pixels) as discussed in further detail below. The refinements can further include removing noise data, e.g., the background, such that the result only contains the foreground, e.g., the subject.

The segmentation engine 610 comprises multiple parameters that are trained on manually labeled training data (e.g., images with areas manually labeled as hair, manually labeled as face, etc.) For example, 20,000 images may be manually labeled by one or more human labelers. To manually label an image, the human labeler draws a polygon for each of the objects (e.g., hair, face) in a given image. The labeling engine 620 (discussed below) stores the coordinates of the vertices of the polygon as training data. In some example embodiments, each image is labeled by multiple human labelers to ensure assignments of labels are consistent. After all images in the training set are labeled, the polygons are used to generate a label mask for each labeled image where each pixel has a value denoting the class of that pixel; for example, 0 denotes background, 1 denotes face, 2 denotes hair, and so forth, according to some example embodiments.

Figure 9:
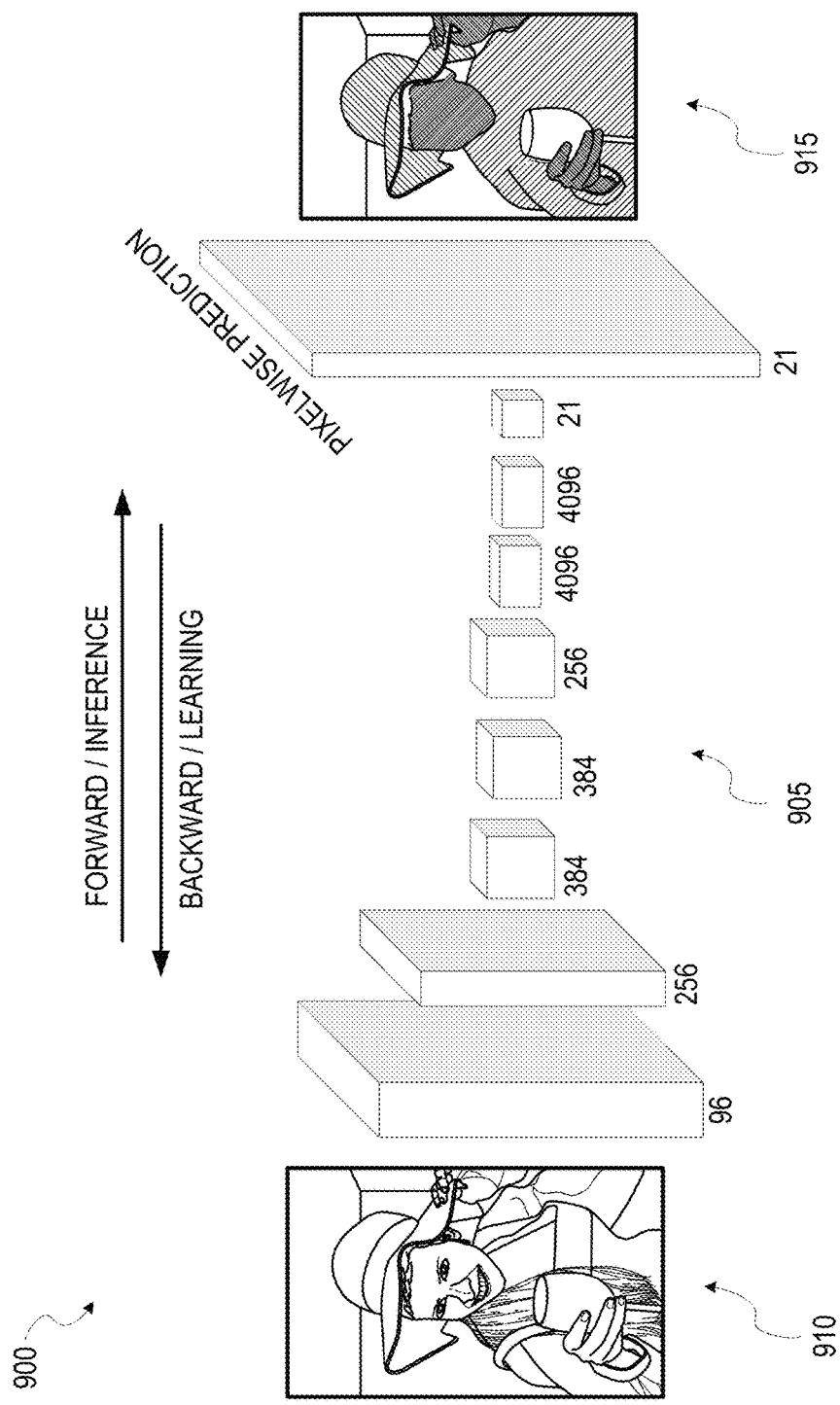
FIG. 9 displays example architecture for the segmentation engine, according to some example embodiments.

FIG. 9 displays example architecture 900 for the segmentation engine 610, according to some example embodiments. The segmentation engine 610 may be implemented using a deep neural network (for example, a fully convolutional neural network). The convolutional neural network may comprise multiple layers 905, including but not limited to a convolution layer, a pooling layer, a rectified-linear layer, and a deconvolutional layer. The layers are stacked together, which means a given layer performs operations on data output from the previous layer, starting from an input image 910. The outputs of each layer are feature map representations in that they contain information spatially corresponding to the input image 910.

The convolution layer applies a bank of filters with learnable parameters to the output of the previous layer. The pooling layer computes a maximum value or an average value for every local window of the previous features. The pooling layer reduces the spatial size of the previous features. The rectified-linear layer thresholds values of previous features to be above zero. The rectified-linear layer acts as the nonlinear operation in the neural network and can increase the expressive power of the network. The deconvolution layer is one of the last layers, according to some example embodiments, and is used to upscale the feature map to the size of input image 910. Since the size of an output data 915 of the deconvolution layer is the same as the size of the input image 910, the output data 915 can be used to generate class scores for each pixel. The scores are further normalized using a SoftMax function to represent the probability of each pixel belonging to different classes. In some implementations, there are multiple layers of each type of layer (e.g., multiple convolutional layers, multiple pooling layers, etc.) in one fully convolutional network in the segmentation engine 610.

To efficiently execute from devices having constrained processing power, memory, and/or electrical power (e.g., a mobile device), the image mask system 210 may integrate several approaches to improve efficiency. In a first approach, the segmentation engine 610 only implements a single deconvolution layer with a large upscale factor. Deconvolution layers can be computationally inefficient (e.g., time-consuming) compared to other layers in a given network. Multiple deconvolution layers with smaller upscale factors are slower than a single deconvolution layer with a large upscale factor.

In a second approach, the first two layers in the plurality of layers 905 down sample the image four times on each side. By using this approach, the layers that follow the first two only need to process 1/16 of the input size, which increases the computational speed of those layers. Further, the prediction accuracy of the learned model in the segmentation engine 610 is not affected by the downsampling approach.

Figure 10:
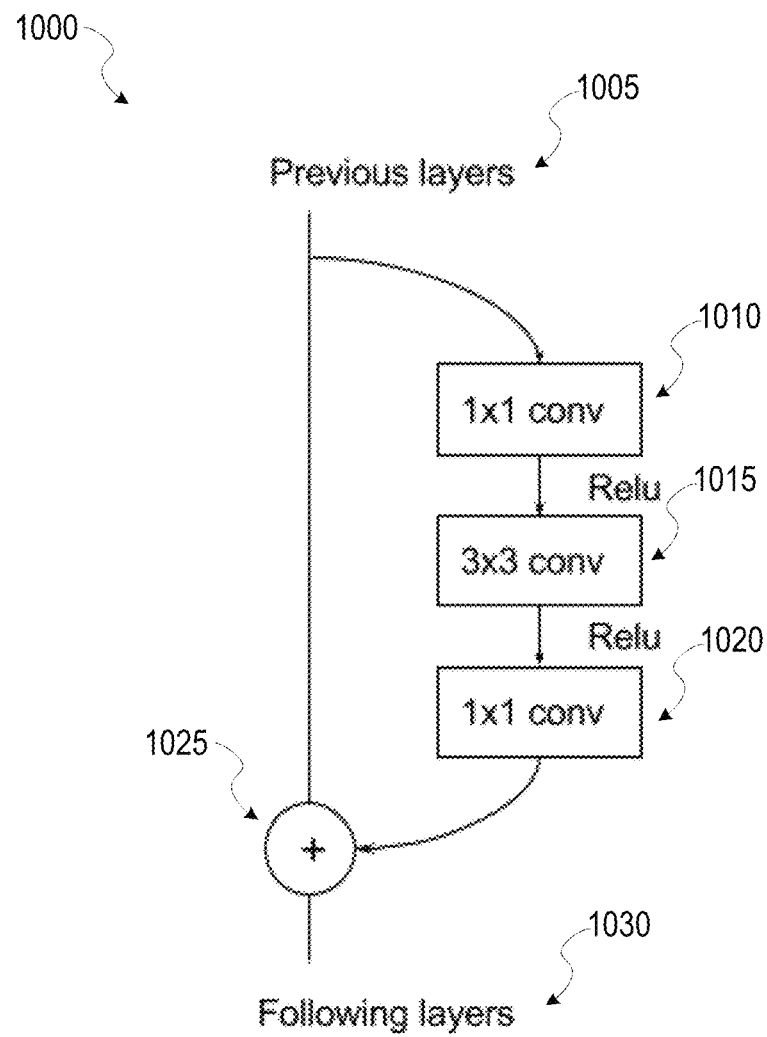
FIG. 10 shows an example architecture of a bottle module, according to some example embodiments.

In a third approach, the segmentation engine 610 implements one or more bottleneck modules, according to some example embodiments. An example of a bottleneck module 1000 is illustrated in FIG. 10. The output of one or more previous layers 1005 is first fed into 1×1 convolution layer 1010, which reduces the channels of the feature map output by the previous layer 1005. The output from the 1×1 convolution layer 1010 is fed into a 3×3 convolution layer 1015. The output from the 3×3 convolution layer 1015 is fed into a 1×1 convolution layer 1020 to increase the channels in the feature map. A summarizer 1025 (e.g., a skip-connection) then sums the output of 1×1 convolution layer 1020 with the feature map from the one or more previous layers 1005. In this way, the computational requirements are greatly reduced as compared to a normal 3×3 convolution layer.

Figure 11:
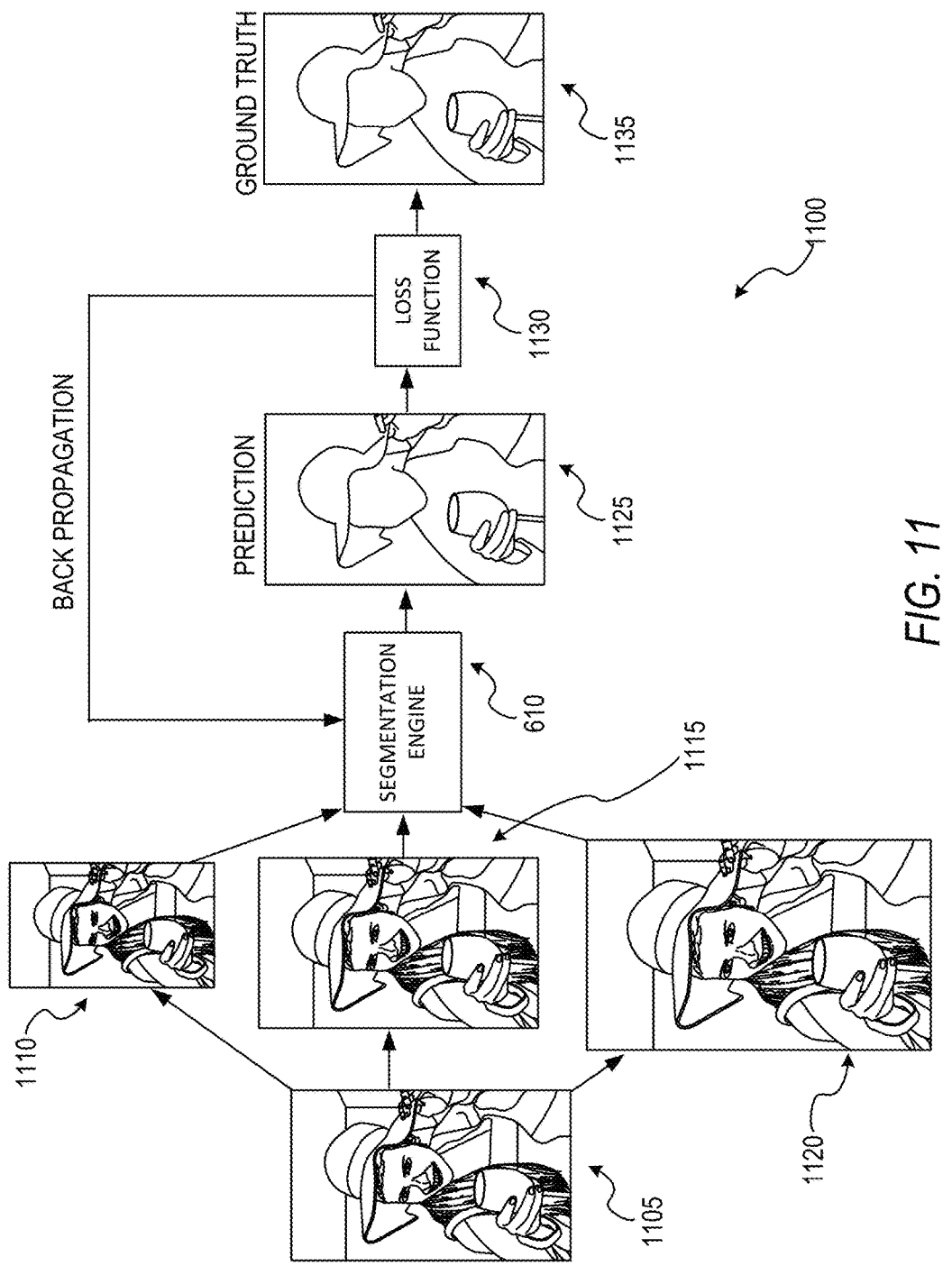
FIG. 11 shows an example of processing using different sized image sets of one or more images, according to some example embodiments.

In a fourth approach, as illustrated by the architecture 1100 in FIG. 11, the images are pre-processed to different sizes to use as inputs for client devices having different processing powers, according to some example embodiments. The resizing engine 605 may resize one or more input images, e.g., image 1105, into different resolutions as part of a multi-scale training process for a multi-scale model (e.g., multi-scale model of a neural network). For example, the input images can be resized into a large size image set 1120 (e.g., images width of 96×160 pixels), a medium size image set 1115 (e.g., images with 64×112 pixels), and a small size image set 1110 (e.g., images with 48×80 pixels). The different sized image sets can be used as training data to train the convolutional neural network in the segmentation engine 610. In particular, as illustrated in FIG. 11, the large size image set 1120, the medium size image set 1115, and the small size image set 1110 are input into the segmentation engine 610 to generate initial predictions, e.g., predicated image mask 1125. The initial predicated images can be compared against a ground truth image mask 1135 and the neural network can be trained through loss function adjustments 1130 (e.g., back propagation) until the prediction more closely approximates the ground truth images.

After the multi-scale training process is complete (e.g., at runtime), the segmentation engine 610 can operate from different types of client devices (e.g., iPhone® 7, iPhone® 6, iPhone® 4) and use the same model even though the client devices may use different resolutions.

In some example embodiments, each of the different sized training data is used to train different separate convolutional neural networks. In those example embodiments, the segmentation engine 610 identifies the client device type and selects the appropriate model for the resolution of the client device images. For example, if the client device is an iPhone® 7, the segmentation engine 610 uses the model trained on the large size image set 1120, whereas if the client device is an iPhone® 4, the segmentation engine 610 uses the model trained on the small size image set 1110.

Figure 12:
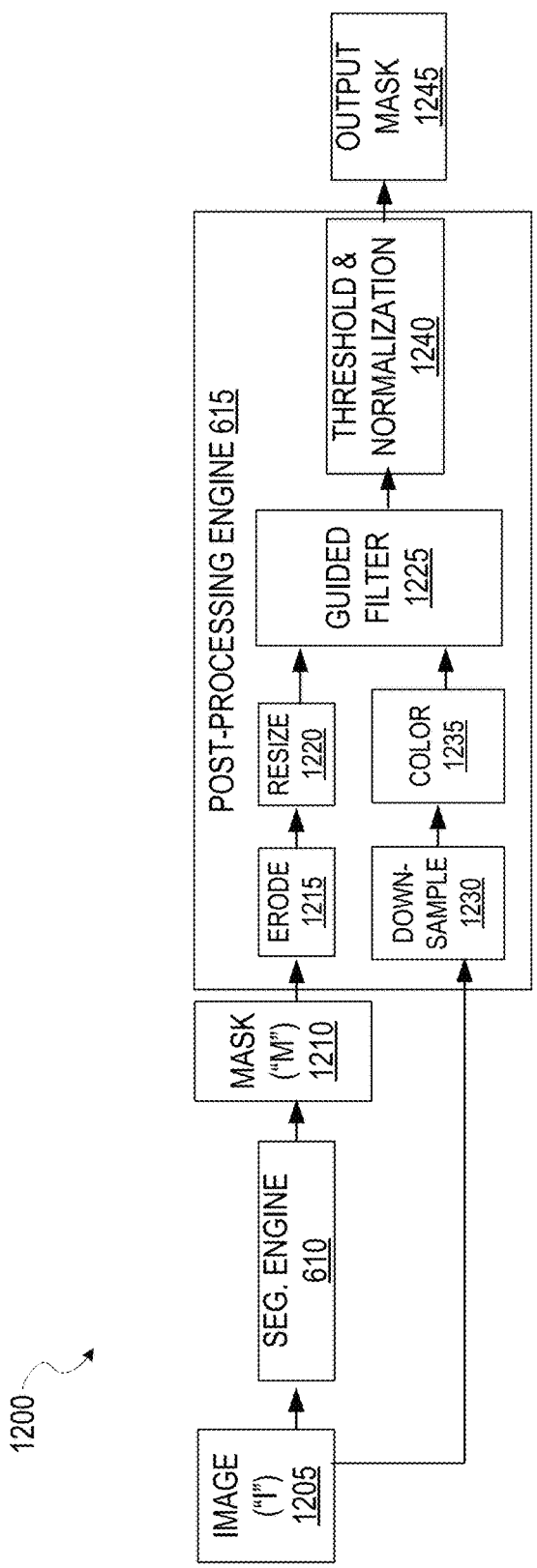
FIG. 12 shows an example architecture of a post-processing engine, according to some example embodiments.

FIG. 12 shows an architecture 1200 and internal functional components for the post-processing engine 615, according to some example embodiments. To reduce the potential jittering of the image segmentation mask, we apply a temporal smoothing over a series of consecutive images, as follows:

$$\text{Mask}^{(t)}_{average} = (1 - \text{coef}_{temporal}) \cdot \text{Mask}^{(t-1)}_{average} + \text{coef}_{temporal} \cdot \text{Mask}^{(t)}$$

Above, $\text{Mask}^{(t)}_{average}$ is the smoothed segmentation mask, $\text{coef}_{temporal}$ is the temporal coefficient that can be set up by the application, and t represents the current frame. The output mask generated by the deep neural network (DNN) is a rough mask with a low resolution. Direct use of the segmentation masks can lead to poor segmentation effect due to the lack of details and edge information.

To overcome this issue, a post-processing pipeline is applied to refine the segmentation mask and improve the quality of the final result. The steps of the post-processing pipeline include color space conversion, image erosion, guided filter, thresholding, and normalization, which are performed by the block engines in FIG. 12. As an example, assume the original input image is image 1205, and the segmentation engine 610 (a trained DNN) outputs initial mask 1210. In a typical use case on high-tier mobile device, image 1205 is a 3-channel RGB image with a resolution of 720×1280, while the initial mask 1210 is a grayscale image with a resolution of 96×160. The resolution can be different according to the computational capability of the devices to guarantee a better user experience by maintaining a reasonable frame rate.

The following steps of image processing are applied to improve the mask 1210 generated by the segmentation engine 610 (e.g., the DNN in the segmentation engine):

Use erode module 1215 to erode the initial mask 1215 to generate a new erode mask.

Use the downsample module 1230 to downsample image 1205 by a downscale factor $S_{downsample}$. For instance, if $S_{dsample} = 1/2$, then $I_{downsample} = S_{downsample} \cdot I$ (where I=image 1205);

Use color module 1235 to convert $I_{downsample}$ into grayscale image $I_{gray}$;

In the upper pipeline, to match the size of the grayscale image $I_{gray}$, In a resize module 1220, the new erode mask (output by erode module 1215) is resized to generate a new resized mask image $M_{resize}$;

Apply guided filter 1125 using $I_{gray}$ and $M_{resize}$ to generate a new mask, $M_{gf}$, the guided filter may use image 1205 that corresponds to 1210 to smooth over imperfections and errors in the mask 1210;

Use threshold and normalization module 1240 to improve the quality of the new mask $M_{gf}$ by combining the pixel information from both new erode mask (output by erode module 1215) and $M_{gf}$;

Use threshold and normalization module 1240 to apply thresholding operation on improved mask; and Use threshold and normalization module 1240 to rescale the pixel values in the combined mask to achieve a smooth transition on the mask edges.

Figure 13:
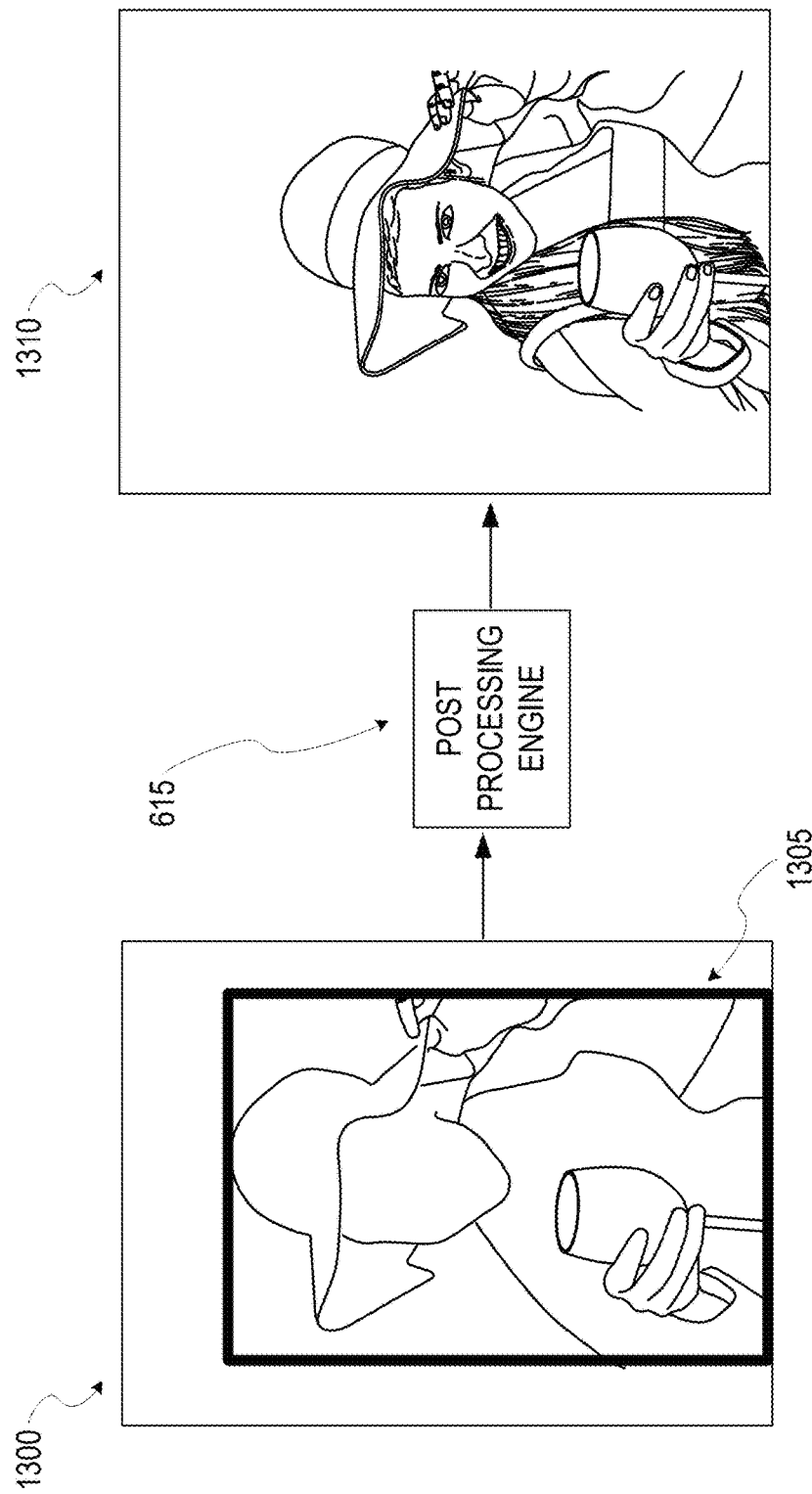
FIG. 13 shows an example architecture for efficient post-processing, according to some example embodiments.

In some example embodiments, to reduce the effective computation requirement, the above post-processing algorithm is applied on only on a cropped area of an image. For example, as shown in the FIG. 13, the post-processing engine 615 only implements post-processing in the area 1305 (inside black frame) of portrait mask 1300. In this way, the post-processing engine 615 is able to generate the resultant image data 1310 while avoiding unnecessary computations involving the background area (e.g., areas outside the black frame).

Figure 14:
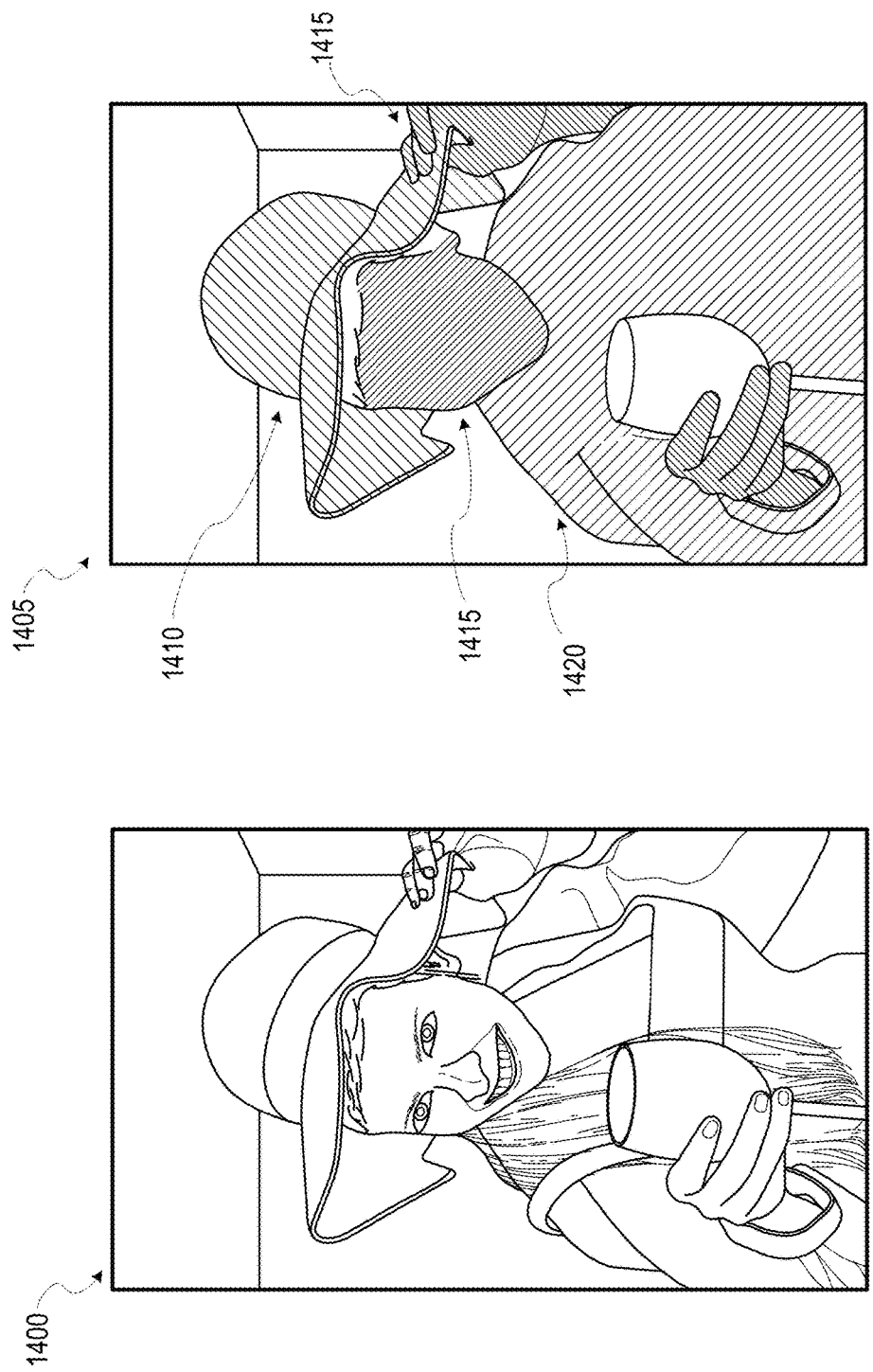
FIG. 14 shows an example input image of a labeled subject, according to some example embodiments.

FIG. 14 shows an example input image 1400 of a subject holding a beverage, according to some example embodiments. FIG. 14 further shows an example output image mask 1405 with each of the pixels of the subject assigned to different classes. In particular, the hat is in a first class 1410 (denoted by right-leaning wide-space diagonal lines), the subject's skin (face and hands) is in a second class 1415 (denoted by a left-leaning thin-spaced diagonal lines), and the subject's dress is in a third class 1420 (denoted by left leaning wide-spaced diagonal lines). As illustrated in FIG. 14, the input image 1400 and the output image mask 1405 are separate files that have similar pixel dimensions (height and width). Each pixel of the input image 1400 may have three or more channels to depict the subject (e.g., RGB channels); whereas each pixel of the image mask may have a pre-set value for a given area. For example, the pixels labeled by the first class 1410 (e.g., the pixels that depict the hat) may be given a value of 1, and the pixels labeled by the second class 1415 (e.g., the pixels that depict the subject's skin) may be given a value of 2, and the pixels labeled by the first class 1420 (e.g., the pixels that depict the dress) may be given a value of 3, and so on. Image editing algorithms, such as an algorithm configured to re-color the subject's skin to a false color, may apply the re-coloration to the original image 1400 referencing specific values of the areas contained in the image mask 1405. Although only three areas are shown (in three classes 1410, 1415, and 1420), it is appreciated that many labels may exist, each corresponding to a new class. For example, in some embodiments the face is labeled differently than the hands. In those example embodiments, the face may belong to a separate class than the hands and be labeled as such.

According to some example embodiments, the segmentation engine 610 is further configured to apply the following guidelines:

1. Pixels corresponding to ears should be labeled as face (e.g., in the face class).

2. Pixels corresponding to masks, glasses, and goggles should be labeled as face.

3. Pixels corresponding to a beard or mustache should be labeled as face.

4. Pixels corresponding to headwear should be labeled as headwear. However, if the headwear is attached to a coat (e.g., a hood), then the corresponding pixels should be labeled as clothes. A headscarf is headwear and pixels corresponding to a headscarf should be labeled as headwear even it extends to or over the body. Further, pixels corresponding to an ordinary scarf should be labeled as clothes.

5. Pixels corresponding to earrings are labeled as face.

6. Pixels corresponding to visible skin on a subject's body are labeled as body skin.

7. Pixels corresponding to visible skin on neck should be labeled as body skin.

8. Pixels corresponding to small gadgets on arms and hands, such as watches, bracelets, and rings, are labeled as body skin.

9. Pixels corresponding to necklaces and neck bands are labeled as body skin if they are overlaid on body skin, but are labeled as clothes if they are overlaid on clothes.

10. For images with multiple persons: only label images with three or less major persons, ignore images with four or more people. Do not label pixels corresponding to far away persons in the background of the image.

11. Pixels corresponding to hand-carried objects, e.g., bags, drinks, are considered background.

To further improve the frame rate in some low-tier client devices, the segmentation engine 610 only applies the neural network to periodic keyframes (e.g., alternating frames of the original image sequence), and applies a post-processing algorithm (e.g., guided filter) to the rest of the frames that were not processed using the neural network. In this way, the image mask system 210 can generate usable segmentation masks on a client device with limited resources. For example, the segmentation engine 610 executes neural network to generate an image mask for every Nth frame of an image sequence. For the remaining frames, the post-processing engine 615 applies a guided filter with the mask from a preceding frame (e.g., the preceding keyframe) and the current frame (e.g., a non-keyframe) to generate a mask for the current frame. Compared to the original algorithm, the speedup can be estimated as follows:

$$\text{Speedup} = (N^*(t_{dnn}+t_{gf}))/(t_{dnn}+(N-1)^*t_{gf})$$

Using the time measured on a high-tier client device (e.g., iPhone® 7) as an example, t_dnn=13 ms and t_gf=3 ms. Assume we run DNN on every 2 frames. In this case, the resulting speedup is approximately 2×.

Figure 15:
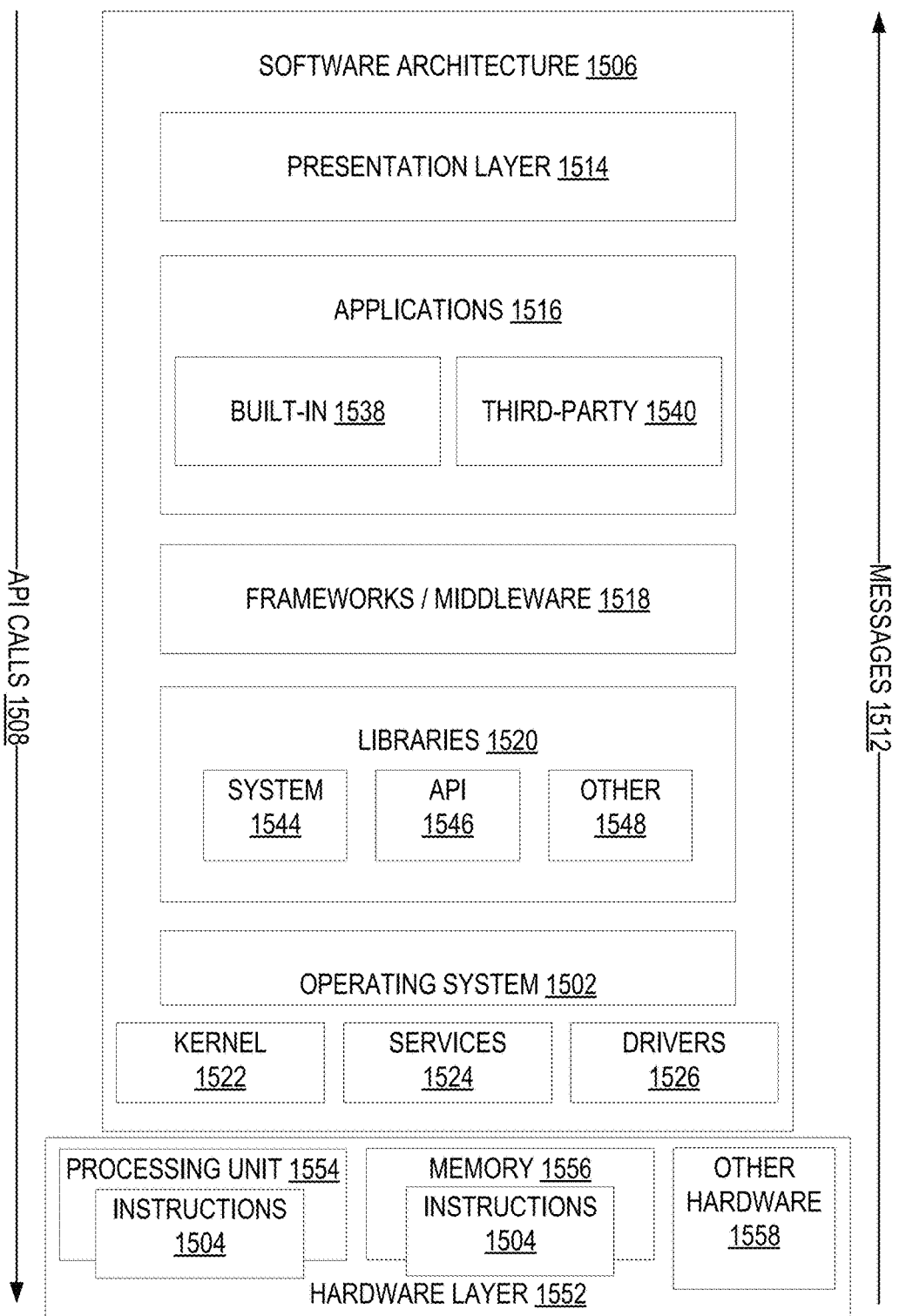
FIG. 15 is a block diagram illustrating a representative software architecture, which may be used in conjunction with various hardware architectures herein described.

FIG. 15 is a block diagram illustrating an example software architecture 1506, which may be used in conjunction with various hardware architectures herein described. FIG. 15 is a non-limiting example of a software architecture, and it will be appreciated that many other architectures may be implemented to facilitate the functionality described herein. The software architecture 1506 may execute on hardware such as a machine 1600 of FIG. 16 that includes, among other things, processors, memory, and input/output (I/O) components. A representative hardware layer 1552 is illustrated and can represent, for example, the machine 1600 of FIG. 16. The representative hardware layer 1552 includes a processing unit 1554 having associated executable instructions 1504. The executable instructions 1504 represent the executable instructions of the software architecture 1506, including implementation of the methods, components, and so forth described herein. The hardware layer 1552 also includes a memory/storage 1556, which also has the executable instructions 1504. The hardware layer 1552 may also comprise other hardware 1558.

In the example architecture of FIG. 15, the software architecture 1506 may be conceptualized as a stack of layers where each layer provides particular functionality. For example, the software architecture 1506 may include layers such as an operating system 1502, libraries 1520, frameworks/middleware 1518, applications 1516, and a presentation layer 1514. Operationally, the applications 1516 and/or other components within the layers may invoke API calls 1508 through the software stack and receive a response in the form of messages 1512. The layers illustrated are representative in nature and not all software architectures have all layers. For example, some mobile or special-purpose operating systems may not provide a frameworks/middleware 1518, while others may provide such a layer. Other software architectures may include additional or different layers.

The operating system 1502 may manage hardware resources and provide common services. The operating system 1502 may include, for example, a kernel 1522, services 1524, and drivers 1526. The kernel 1522 may act as an abstraction layer between the hardware and the other software layers. For example, the kernel 1522 may be responsible for memory management, processor management (e.g., scheduling), component management, networking, security settings, and so on. The services 1524 may provide other common services for the other software layers. The drivers 1526 are responsible for controlling or interfacing with the underlying hardware. For instance, the drivers 1526 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1520 provide a common infrastructure that is used by the applications 1516 and/or other components and/or layers. The libraries 1520 provide functionality that allows other software components to perform tasks in an easier fashion than by interfacing directly with the underlying operating system 1502 functionality (e.g., kernel 1522, services 1524, and/or drivers 1526). The libraries 1520 may include system libraries 1544 (e.g., C standard library) that may provide functions such as memory allocation functions, string manipulation functions, mathematical functions, and the like. In addition, the libraries 1520 may include API libraries 1546 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1520 may also include a wide variety of other libraries 1548 to provide many other APIs to the applications 1516 and other software components/modules.

The frameworks/middleware 1518 provide a higher-level common infrastructure that may be used by the applications 1516 and/or other software components/modules. For example, the frameworks/middleware 1518 may provide various graphic user interface (GUI) functions, high-level resource management, high-level location services, and so forth. The frameworks/middleware 1518 may provide a broad spectrum of other APIs that may be utilized by the applications 1516 and/or other software components/modules, some of which may be specific to a particular operating system 1502 or platform.

The applications 1516 include built-in applications 1538 and/or third-party applications 1540. Examples of representative built-in applications 1538 may include, but are not limited to, a contacts application, a browser application, a book reader application, a location application, a media application, a messaging application, and/or a game application. The third-party applications 1540 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1540 may invoke the API calls 1508 provided by the mobile operating system (such as the operating system 1502) to facilitate functionality described herein.

The applications 1516 may use built-in operating system functions (e.g., kernel 1522, services 1524, and/or drivers 1526), libraries 1520, and frameworks/middleware 1518 to create user interfaces to interact with users of the system. Alternatively, or additionally, in some systems, interactions with a user may occur through a presentation layer, such as the presentation layer 1514. In these systems, the application/component "logic" can be separated from the aspects of the application/component that interact with a user.

Figure 16:
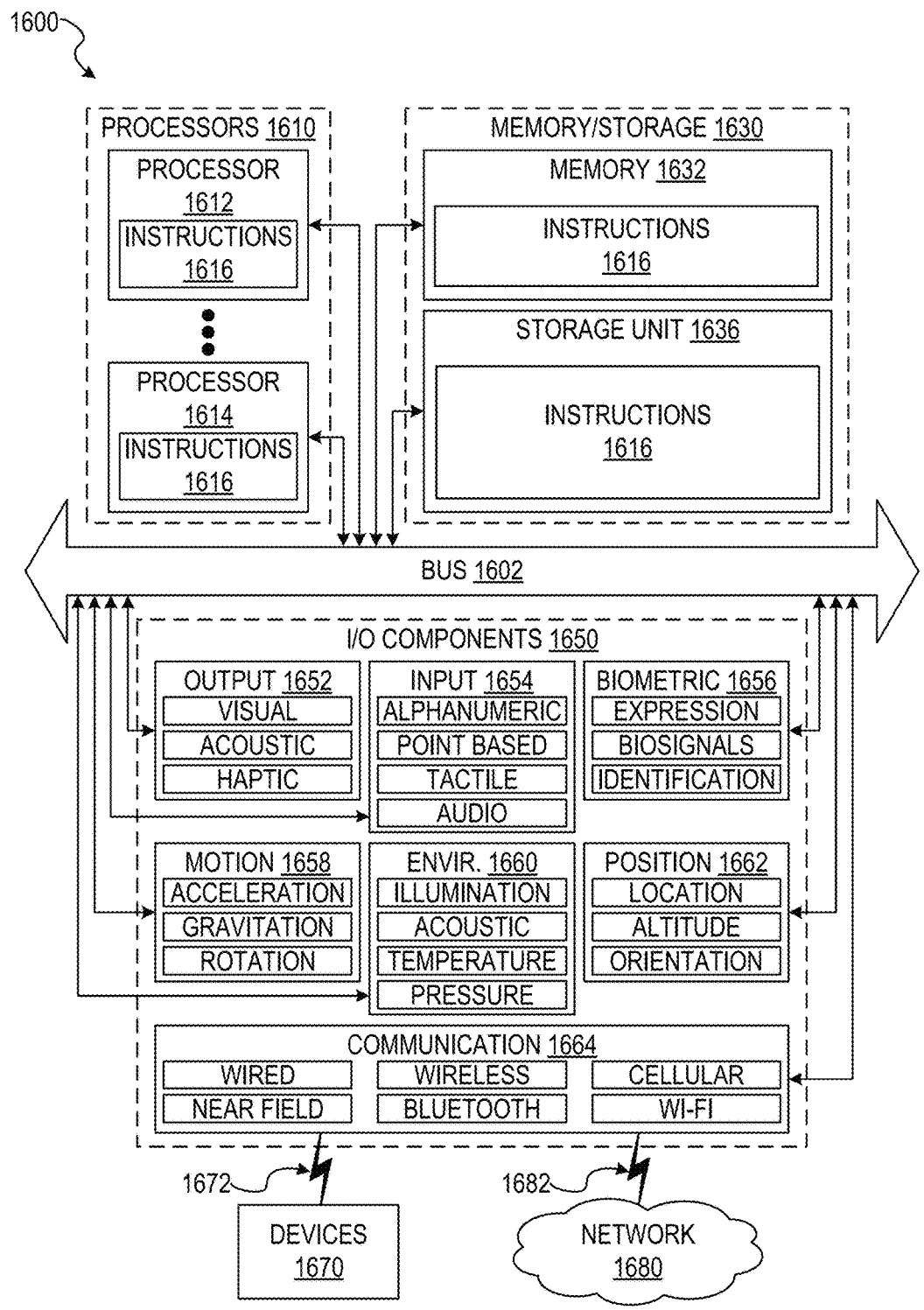
FIG. 16 is a block diagram illustrating components of a machine, according to some example embodiments, able to read instructions from a machine-readable medium (e.g., a machine-readable storage medium) and perform any one or more of the methodologies discussed herein.

FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. As such, the instructions 1616 may be used to implement modules or components described herein. The instructions 1616 transform the general, non-programmed machine 1600 into a particular machine 1600 programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1616, sequentially or otherwise, that specify actions to be taken by the machine 1600. Further, while only a single machine 1600 is illustrated, the term "machine" shall also be taken to include a collection of machines that individually or jointly execute the instructions 1616 to perform any one or more of the methodologies discussed herein.

The machine 1600 may include processors 1610, memory/storage 1630, and I/O components 1650, which may be configured to communicate with each other such as via a bus 1602. The memory/storage 1630 may include a memory 1632, such as a main memory, or other memory storage, and a storage unit 1636, both accessible to the processors 1610 such as via the bus 1602. The storage unit 1636 and memory 1632 store the instructions 1616 embodying any one or more of the methodologies or functions described herein. The instructions 1616 may also reside, completely or partially, within the memory 1632, within the storage unit 1636, within at least one of the processors 1610 (e.g., within the processor cache memory accessible to processor units 1612 or 1614), or any suitable combination thereof, during execution thereof by the machine 1600. Accordingly, the memory 1632, the storage unit 1636, and the memory of the processors 1610 are examples of machine-readable media.

The I/O components 1650 may include a wide variety of components to receive input, provide output, produce output, transmit information, exchange information, capture measurements, and so on. The specific I/O components 1650 that are included in a particular machine 1600 will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 16. The I/O components 1650 are grouped according to functionality merely for simplifying the following discussion and the grouping is in no way limiting. In various example embodiments, the I/O components 1650 may include output components 1652 and input components 1654. The output components 1652 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1650 may include biometric components 1656, motion components 1658, environment components 1660, or position components 1662 among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1658 may include acceleration sensor components (e.g., accelerometer), gravitation sensor components, rotation sensor components (e.g., gyroscope), and so forth. The environment components 1660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1662 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via a coupling 1682 and a coupling 1672, respectively. For example, the communication components 1664 may include a network interface component or other suitable device to interface with the network 1680. In further examples, the communication components 1664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., a peripheral device coupled via a USB).

Moreover, the communication components 1664 may detect identifiers or include components operable to detect identifiers. For example, the communication components 1664 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1664, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions 1616 for execution by the machine 1600, and includes digital or analog communications signals or other intangible media to facilitate communication of such instructions 1616. Instructions 1616 may be transmitted or received over the network 1680 using a transmission medium via a network interface device and using any one of a number of well-known transfer protocols.

"CLIENT DEVICE" in this context refers to any machine 1600 that interfaces to a communications network 1680 to obtain resources from one or more server systems or other client devices 102. A client device 102 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1680.

"COMMUNICATIONS NETWORK" in this context refers to one or more portions of a network 1680 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1680 may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EMPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message 400 is transitory.

"MACHINE-READABLE MEDIUM" in this context refers to a component, a device, or other tangible media able to store instructions 1616 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1616. The term "machine-readable medium" shall also be taken to include any medium, or combination of multiple media, that is capable of storing instructions 1616 (e.g., code) for execution by a machine 1600, such that the instructions 1616, when executed by one or more processors 1610 of the machine 1600, cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1612 or a group of processors 1610) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1600) uniquely tailored to perform the configured functions and are no longer general-purpose processors 1610. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1612 configured by software to become a special-purpose processor, the general-purpose processor 1612 may be configured as respectively different special-purpose processors (e.g., comprising different hardware components) at different times. Software accordingly configures a particular processor 1612 or processors 1610, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1610 that are temporarily configured (e.g., by software) or permanently configured to perform the relevant operations. Whether temporarily or permanently configured, such processors 1610 may constitute processor-implemented components that operate to perform one or more operations or functions described herein. As used herein, "processor-implemented component" refers to a hardware component implemented using one or more processors 1610. Similarly, the methods described herein may be at least partially processor-implemented, with a particular processor 1612 or processors 1610 being an example of hardware. For example, at least some of the operations of a method may be performed by one or more processors 1610 or processor-implemented components. Moreover, the one or more processors 1610 may also operate to support performance of the relevant operations in a "cloud computing" environment or as a "software as a service" (SaaS). For example, at least some of the operations may be performed by a group of computers (as examples of machines 1600 including processors 1610), with these operations being accessible via a network 1680 (e.g., the Internet) and via one or more appropriate interfaces (e.g., an API). The performance of certain of the operations may be distributed among the processors 1610, not only residing within a single machine 1600, but deployed across a number of machines 1600. In some example embodiments, the processors 1610 or processor-implemented components may be located in a single geographic location (e.g., within a home environment, an office environment, or a server farm). In other example embodiments, the processors 1610 or processor-implemented components may be distributed across a number of geographic locations.

"PROCESSOR" in this context refers to any circuit or virtual circuit (a physical circuit emulated by logic executing on an actual processor 1612) that manipulates data values according to control signals (e.g., "commands," "op codes," "machine code," etc.) and which produces corresponding output signals that are applied to operate a machine 1600. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1610 may further be a multi-core processor 1610 having two or more independent processors 1612, 1614 (sometimes referred to as "cores") that may execute instructions 1616 contemporaneously.

"TIMESTAMP" in this context refers to a sequence of characters or encoded information identifying when a certain event occurred, for example giving date and time of day, sometimes accurate to a small fraction of a second.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, SNAP INC., All Rights Reserved.

What is claimed is:

1. A method comprising:
generating, using one or more processors of a user device, a plurality of images, each of the plurality of images comprising a plurality of pixels;
generating, by the one or more processors, keyframe mask data for keyframes of the plurality of images using a machine learning scheme, the keyframe mask data assigning pixels from the plurality of pixels to a plurality of segments, each segment from the plurality of segments describing a type of image feature area depicted in the plurality of images;
generating, by the one or more processors, non-keyframe mask data for non-keyframes of the plurality of images by, for a given non-keyframe, applying a guided filter to the given non-keyframe and a preceding keyframe mask, the preceding keyframe mask generated by the machine learning scheme from a keyframe that precedes the given non-keyframe in the plurality of images;
generating, by the one or more processors, a plurality of modified images by applying a visual effect to pixels in the plurality of images that correspond to a specified segment from the plurality of segments; and
storing, by the one or more processors, the plurality of modified images in memory of the user device.

2. The method of claim 1, wherein the plurality of images is an image sequence, and the keyframe mask data and the non-keyframe mask data are image masks.

3. The method of claim 2, wherein each image mask is smoothed by averaging values in each image mask with values of a preceding image mask.

4. The method of claim 1, wherein a particular image mask from the keyframe mask data or the non-keyframe mask data is filtered using a particular image used to generate the particular image mask as an additional guided filter.

5. The method of claim 1, wherein the plurality of segments includes a first segment for a hair image feature area, a second segment for a skin image feature area, and a third segment for a clothes image feature area.

6. The method of claim 1, wherein the visual effect is one or more of: a color modification, an image overlay, a scale transformation.

7. The method of claim 1, wherein the plurality of images comprise a foreground and a background, wherein pixels that correspond to the background are not assigned to the plurality of segments.

8. The method of claim 1, wherein the machine learning scheme is a convolutional neural network having, at most, one deconvolutional layer.

9. The method of claim 1, further comprising:
receiving a set of training images from a plurality of users, each training image depicting different image feature areas that are manually assigned to segments of the plurality of segments by the plurality of users; and
training the machine learning scheme using the set of training images.

10. The method of claim 1, further comprising:
generating a scaled set of training images by decreasing a size of each training image in a set of training images;

training an additional machine learning scheme using the scaled set of training images;

determining a model type of the user device; and selecting the machine learning scheme based on the model type of the user device being pre-associated with the set of training images.

11. The method of claim 1, wherein the keyframes are alternating frames of the plurality of images that are separated by one or more non-keyframes in the plurality of images.

12. A system comprising:

one or more processors of a machine; and a memory storing instructions that, when executed by the one or more processors, cause the machine to perform operations comprising:

generating a plurality of images, each of the plurality of images comprising a plurality of pixels;

generating, by the one or more processors, keyframe mask data for keyframes of the plurality of images using a machine learning scheme, the keyframe mask data assigning pixels from the plurality of pixels to a plurality of segments, each segment from the plurality of segments describing a type of image feature area depicted in the plurality of images;

generating, by the one or more processors, non-keyframe mask data for non-keyframes of the plurality of images by, for a given non-keyframe, applying a guided filter to the given non-keyframe and a preceding keyframe mask, the preceding keyframe mask generated by the machine learning scheme from a keyframe that precedes the given non-keyframe in the plurality of images;

generating, by the one or more processors, a plurality of modified images by applying a visual effect to pixels in the plurality of images that correspond to a specified segment from the plurality of segments; and storing, by the one or more processors, the plurality of modified images in the memory.

13. The system of claim 12, wherein the plurality of images is an image sequence, and the keyframe mask data and the non-keyframe mask data are image masks.

14. The system of claim 13, wherein each image mask is smoothed by averaging values in each image mask with values of a preceding image mask.

15. The system of claim 12, wherein a particular image mask from the keyframe mask data or the non-keyframe mask data is filtered using a particular image used to generate the particular image mask as an additional guided filter.

16. The system of claim 12, wherein the plurality of segments includes a first segment for a hair image feature area, a second segment for a skin image feature area, and a third segment for a clothes image feature area.

17. The system of claim 12, wherein the visual effect is one or more of: a color modification, an image overlay, a scale transformation.

18. The system of claim 12, wherein the plurality of images comprise a foreground and a background, wherein pixels that correspond to the background are not assigned to the plurality of segments.

19. A non-transitory machine-readable storage device embodying instructions that, when executed by one or more processors of a machine, cause the machine to perform operations comprising:

generating a plurality of images, each of the plurality of images comprising a plurality of pixels;

generating keyframe mask data for keyframes of the plurality of images using a machine learning scheme, the keyframe mask data assigning pixels from the plurality of pixels to a plurality of segments, each segment from the plurality of segments describing a type of image feature area depicted in the plurality of images;

generating non-keyframe mask data for non-keyframes of the plurality of images by, for a given non-keyframe, applying a guided filter to the given non-keyframe and a preceding keyframe mask, the preceding keyframe mask generated by the machine learning scheme from a keyframe that precedes the given non-keyframe in the plurality of images;

generating a plurality of modified images by applying a visual effect to pixels in the one or more images that correspond to a specified segment from the plurality of segments; and storing the plurality of modified images in memory of the machine.

20. The non-transitory machine-readable storage device of claim 19, wherein the plurality of images is an image sequence, and the keyframe mask data and the non-keyframe mask data are image masks.

* * * * *